(12) United States Patent
Moore et al.

(10) Patent No.: US 7,925,827 B2
(45) Date of Patent: Apr. 12, 2011

(54) METHOD AND SYSTEM FOR DIRTY TIME LOGGING

(75) Inventors: William H. Moore, Fremont, CA (US); Jeffrey S. Bonwick, Los Altos, CA (US)

(73) Assignee: Oracle America, Inc., Redwood City, CA (US)

(*) Notice: Subject to any disclaimer, the term of this patent is extended or adjusted under 35 U.S.C. 154(b) by 1253 days.

(21) Appl. No.: 11/407,773

(22) Filed: Apr. 19, 2006

(65) Prior Publication Data

US 2007/0106869 A1 May 10, 2007

Related U.S. Application Data

(60) Provisional application No. 60/734,023, filed on Nov. 4, 2005.

(51) Int. Cl.
G06F 12/00 (2006.01)
G06F 13/00 (2006.01)
G06F 13/28 (2006.01)

(52) U.S. Cl. ............. 711/112; 711/154; 711/E12.002

(58) Field of Classification Search ............... None
See application file for complete search history.

(56) References Cited

U.S. PATENT DOCUMENTS

| | | |
|---|---|---|
| 4,144,522 A | 3/1979 | Kageyama et al. |
| 5,129,085 A | 7/1992 | Yamasaki et al. |
| 5,155,847 A | 10/1992 | Kirouac et al. |
| 5,274,803 A * | 12/1993 | Dubin et al. ............... 1/1 |
| 5,371,885 A | 12/1994 | Letwin |
| 5,403,639 A | 4/1995 | Belsan et al. |
| 5,410,667 A | 4/1995 | Belsan et al. |
| 5,675,802 A | 10/1997 | Allen et al. |
| 5,819,292 A | 10/1998 | Hitz et al. |
| 5,953,742 A * | 9/1999 | Williams ............... 711/154 |
| 6,209,111 B1 | 3/2001 | Kadyk et al. |
| 6,341,341 B1 | 1/2002 | Grummon et al. |
| 6,536,033 B1 | 3/2003 | Weerawarana et al. |
| 6,745,284 B1 | 6/2004 | Lee et al. |
| 6,745,305 B2 | 6/2004 | Nalwa |
| 6,795,966 B1 | 9/2004 | Lim et al. |
| 6,820,098 B1 * | 11/2004 | Ganesh et al. ............ 1/1 |
| 6,829,617 B2 | 12/2004 | Sawdon et al. |
| 6,857,001 B2 | 2/2005 | Hitz et al. |
| 6,892,211 B2 | 5/2005 | Hitz et al. |
| 6,977,787 B2 * | 12/2005 | Ito ............... 360/53 |
| 7,007,196 B2 | 2/2006 | Lee et al. |
| 7,032,154 B2 | 4/2006 | Kidorf et al. |
| 7,039,661 B1 * | 5/2006 | Ranade ............... 1/1 |
| 7,043,677 B1 | 5/2006 | Li |

(Continued)

OTHER PUBLICATIONS

Johnson, J. E. et al.; "Overview of the Spiralog File System", Digital Technical Journal, vol. 8, No. 2, 1996, pp. 5-14 (10 pages).

(Continued)

*Primary Examiner* — Matt Kim
*Assistant Examiner* — Matthew R Chrzanowski
(74) *Attorney, Agent, or Firm* — Osha • Liang LLP

(57) ABSTRACT

A method for storing a block in a file system includes attempting to store the block at a location on a disk, where the block is associated with a birth time and is selected from a group consisting of a data block and an indirect block, and updating a dirty time log (DTL) with the birth time if the block is not stored successfully on the disk.

15 Claims, 7 Drawing Sheets

U.S. PATENT DOCUMENTS

| | | | |
|---|---|---|---|
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,197,599 B2* | 3/2007 | Corrado | 711/114 |
| 7,200,715 B2 | 4/2007 | Kleiman et al. | |
| 7,340,572 B2* | 3/2008 | Cochran | 711/162 |
| 7,340,640 B1 | 3/2008 | Karr et al. | |
| 7,389,379 B1* | 6/2008 | Goel et al. | 711/112 |
| 7,389,396 B1* | 6/2008 | Goel et al. | 711/167 |
| 7,395,378 B1* | 7/2008 | Pendharkar et al. | 711/144 |
| 7,467,265 B1* | 12/2008 | Tawri et al. | 711/161 |
| 7,657,796 B1* | 2/2010 | Kaiser et al. | 714/54 |
| 7,669,032 B2* | 2/2010 | Karr et al. | 711/203 |
| 7,680,839 B1* | 3/2010 | Krishnamurthy et al. | 711/162 |
| 2002/0004883 A1 | 1/2002 | Nguyen et al. | |
| 2002/0055942 A1 | 5/2002 | Reynolds | |
| 2002/0087788 A1 | 7/2002 | Morris | |
| 2002/0161972 A1 | 10/2002 | Talagala et al. | |
| 2003/0033477 A1 | 2/2003 | Johnson et al. | |
| 2003/0041211 A1* | 2/2003 | Merkey et al. | 711/114 |
| 2003/0070043 A1* | 4/2003 | Merkey | 711/114 |
| 2003/0084242 A1 | 5/2003 | Strange et al. | |
| 2003/0126107 A1 | 7/2003 | Yamagami | |
| 2003/0145167 A1 | 7/2003 | Toshiba | |
| 2003/0158834 A1* | 8/2003 | Sawdon et al. | 707/1 |
| 2003/0170012 A1* | 9/2003 | Cochran | 386/125 |
| 2003/0182313 A1* | 9/2003 | Federwisch et al. | 707/200 |
| 2004/0024973 A1 | 2/2004 | Chron et al. | |
| 2004/0030822 A1 | 2/2004 | Rajan et al. | |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0143713 A1 | 7/2004 | Niles et al. | |
| 2004/0225834 A1 | 11/2004 | Lu et al. | |
| 2004/0234000 A1 | 11/2004 | Page | |
| 2004/0268068 A1 | 12/2004 | Curran et al. | |
| 2005/0010620 A1 | 1/2005 | Silvers et al. | |
| 2005/0097270 A1 | 5/2005 | Kleiman et al. | |
| 2005/0144202 A1* | 6/2005 | Chen | 707/205 |
| 2005/0144381 A1* | 6/2005 | Corrado | 711/114 |
| 2005/0235154 A1 | 10/2005 | Serret-Avila | |
| 2006/0085595 A1* | 4/2006 | Slater | 711/114 |
| 2006/0112251 A1* | 5/2006 | Karr et al. | 711/170 |
| 2006/0168409 A1 | 7/2006 | Kahn et al. | |
| 2006/0218135 A1* | 9/2006 | Bisson et al. | 707/4 |
| 2006/0218644 A1 | 9/2006 | Niles et al. | |
| 2006/0256965 A1 | 11/2006 | Rowe | |
| 2007/0094464 A1* | 4/2007 | Sharma et al. | 711/162 |
| 2007/0094465 A1* | 4/2007 | Sharma et al. | 711/162 |
| 2007/0094466 A1* | 4/2007 | Sharma et al. | 711/162 |
| 2008/0049504 A1* | 2/2008 | Kasahara et al. | 365/185.09 |

OTHER PUBLICATIONS

Santry, D. S. et al.; "Deciding When to Forget in the Elephant File System"; 17th ACM Symposium on Operating Systems Principles (SOSP '99), Dec. 1999; pp. 110-123 (14 pages).
Chutani, S. et al., "The Episode File System", Proceedings of the 1992 USENIX Winter Technical Conference; 1992; (18 pages).
Seltzer, M.L.; "File System Performance and Transaction Support"; University of California at Berkeley, 1992 (131 pages).
Octavian Lascu et al, "Configuration and Tuning GPFS for Digital Media Environments", Nov. 2005, IBM International Technical Support Organization, p. 38. Available online: http://www.redbooks.ibm/com/redbooks/pdfs/sg246700.pdf.
"An Introduction to GPFS v1.3 for Linux", Jun. 2003. Available online: http://jumpdoc.fz-juelich.de/doc_pdf/gpfs21/GPFs-Linux-wp060303.pdf.
Sanjay Ghemawat et al, "The Google File System", 2003, ACM, p. 3.
Austin, B., "A Dynamic Disc Allocation Algorithm Designed to Reduce Fragmentation During File Reloading", Information Sciences Laboratory, Corporate Research and Development Center, General Electric Company, 4 Pages, 1970.
Goodheart, B., Cox, J. "The Magic Garden Explained" Prentice Hall, 8 Pages, 1994.
Stallings, W. "Computer Organization and Architecture: Designing for Performance", Prentice Hall, 4 Pages, 2000.
Sandberg, R. et al.; "Design and Implementation of the Sun Network Filesystem"; Sun Microsystems, Inc., 1985 USENIX Conference (12 pages).
McKusick, M. K. et al.; "A Fast File System for UNIX"; ACM Transaction on Computer Systems, vol. 2, No. 3, Aug. 1984, pp. 181-197 (17 pages).
Astrahan, M.M. et al.; "System R: Relational Approach to Database Management"; ACM Transactions on Database Systems, vol. 1, No. 2, Jun. 1976, pp. 97-137 (41 pages).
"Veritas File System 3.4 Administrator's Guide" VERITAS Software Corporation, Nov. 2000, http://www.veritas.com; pp. 1-227 (227 pages).
Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).
Osorio, N. et al.; "Guidelines for Using Snapshot Storage Systems for Oracle Databases"; Oracle Corporation, Oct. 2001 (13 pages).
Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).
Sun StorEdge Instant Image 2.0 System Administrator's Guide; Sun Microsystems, Inc., Feb. 2000, Revision A (106 pages).
Ylonen, T.; "Concurrent Shadow Paging: A New Direction for Database Research"; Laboratory of Information Processing Science, Helsinki University of Technology, SF-02150, Espoo, Finland, 1992 (8 pages).
Popek, G. et al.; "The LOCUS Distributed System Architecture"; The MIT Press, Cambridge, Massachusetts, 1985 The Massachusetts Institute of Technology (8 pages).
Gray, J. et al.; "The Recovery Manager of the System R Database Manager"; Computing Surveys, vol. 13, No. 2, Jun. 1981 (20 pages).
Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am May 23, 1991 an der TU Berlin, and English Translation (245 pages).
Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).
"The Enterprise Challenge Served by Snapshot"; Whitepaper, 2001 LSI Logic Corporation (8 pages).
Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).
Suresh, Babu S.; "Persistent Snapshots"; Department of Computer Science and Automation, Indian Institute of Science, Bangalore—560 012, Jan. 2000 (38 pages).
"Proceedings of the 5th Annual Linux Showcase & Conference" USENIX Association, Oakland, California, Nov. 5-10, 2001 (11 pages).
Borg, A. et al.; "Fault Tolerance Under UNIX"; ACM Transactions on Computer Systems, vol. 7, No. 1, Feb. 1989, pp. 1-24 (24 pages).
Rosenblum, M. et al.; "The Design and Implementation of a Log-Structured File System"; Electrical Engineering and Computer Sciences, Computer Science Division, Univeristy of California, 1991 (15 pages).
Hecht, M. S. et al.; "Shadowed Management of Free Disk Pages with a Linked List"; ACM Transactions on Database Systems, vol. 8, No. 4, Dec. 1983, pp. 503-514 (12 pages).
Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).
Lorie, R. A.; "Physical Integrity in a Large Segmented Database"; ACM Transactions on Database Systems, vol. 2, No. 1, Mar. 1977, pp. 91-104 (14 pages).

* cited by examiner

METHOD AND SYSTEM FOR DIRTY TIME LOGGING

CROSS-REFERENCE TO RELATED APPLICATIONS

This application claims benefit of U.S. Provisional Application Ser. No. 60/734,023 filed on Nov. 4, 2005, entitled "DIRTY TIME LOGGING AND RESILVERING" in the names of William H. Moore and Jeffrey S. Bonwick.

This application is related to U.S. patent application Ser. No. 11/407,744, filed on Apr. 19, 2006 and entitled "Method and System for Dirty Time Log Directed Resilvering," U.S. patent application Ser. No. 11/407,719, filed on Apr. 19, 2006 and entitled "Method and System for Metadata-Based Resilvering," and U.S. patent application Ser. No. 11/409,427, filed on Apr. 19, 2006 and entitled "Method and System for Pruned Resilvering Using a Dirty Time Log," the entire contents of which are incorporated herein by reference. All the referenced applications are co-owned by the same assignee.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; and "Automatic Conversion of All-Zero Data Storage Blocks into File Holes" (application Ser. No. 10/853,915) filed on May 26, 2004.

BACKGROUND

Typical computer systems include a file system for storing and accessing files. In addition to storing system files (operating system files, device driver files, etc.), the file system provides storage and access of user data files. If any of these files (system files and/or user files) contain critical data, then it becomes advantageous to employ a data backup scheme to ensure that critical data are not lost if a file storage device fails. One data backup scheme that is commonly employed is mirroring. Mirroring involves maintaining two or more copies of a file, where each copy of the file is located on a separate file storage device (e.g., a local hard disk, a networked hard disk, a network file server, etc.).

When one or more file storage devices fails for any length of time, the file storage device(s) may become unsynchronized. However, when employing a mirroring scheme, it is of critical importance to ensure that the mirrors are synchronized (i.e., that the contents of each mirror are the same). If a mirror becomes unsynchronized, the simplest recovery scheme involves copying all of the data from a synchronized mirror to the unsynchronized mirror. However, copying all data from one file storage device to another file storage device may take a long time and reduce performance of the file storage devices significantly during the resynchronization process.

Alternatively, dirty region logging (DRL) may be used to facilitate resynchronization. DRL involves dividing each mirror into a number of "regions." Depending on the implementation, the region may be as small as a single disk sector or larger than 256 kilobytes (KB). Prior to modifying the content of a region—for example, when there is a write operation on data within the region—a DRL entry for the region is created in the DRL. In most cases, the DRL entry merely identifies the region where the modification will be attempted. If the region is modified successfully, then the DRL entry is cleared. If the region is not modified successfully, then the DRL entry remains in the DRL. Thus, during a resynchronization process, the DRL may be used to identify which specific regions require resynchronization, rather than resynchronizing the entire file storage device.

Dirty region logging may be more time-efficient then resynchronizing an entire file storage device. However, it also includes system overhead with each modification to a region, since the DRL must be updated prior to each modification to the region. Clearly, this overhead increases with smaller region sizes. Conversely, if the regions are large, there may be significant overhead involved in resynchronizing an entire region, even though only a single disk sector in that region may have been modified.

SUMMARY

In general, in one aspect, the invention relates to a method for storing a block in a file system. The method comprises attempting to store the block at a location on a disk, wherein the block is associated with a birth time and is one selected from a group consisting of a data block and a first indirect block, and updating a dirty time log (DTL) with the birth time if the block is not stored successfully on the disk.

In general, in one aspect, the invention relates to a system. The system comprises a disk configured to store a block, wherein the block is associated with a birth time and is one selected from a data block and a first indirect block, a storage pool allocator configured to store the block on the disk, and a dirty time log (DTL) associated with a file system and configured to store the birth time if the block is not stored successfully.

Other aspects of the invention will be apparent from the following description and the appended claims.

DETAILED DESCRIPTION

Figure 1:
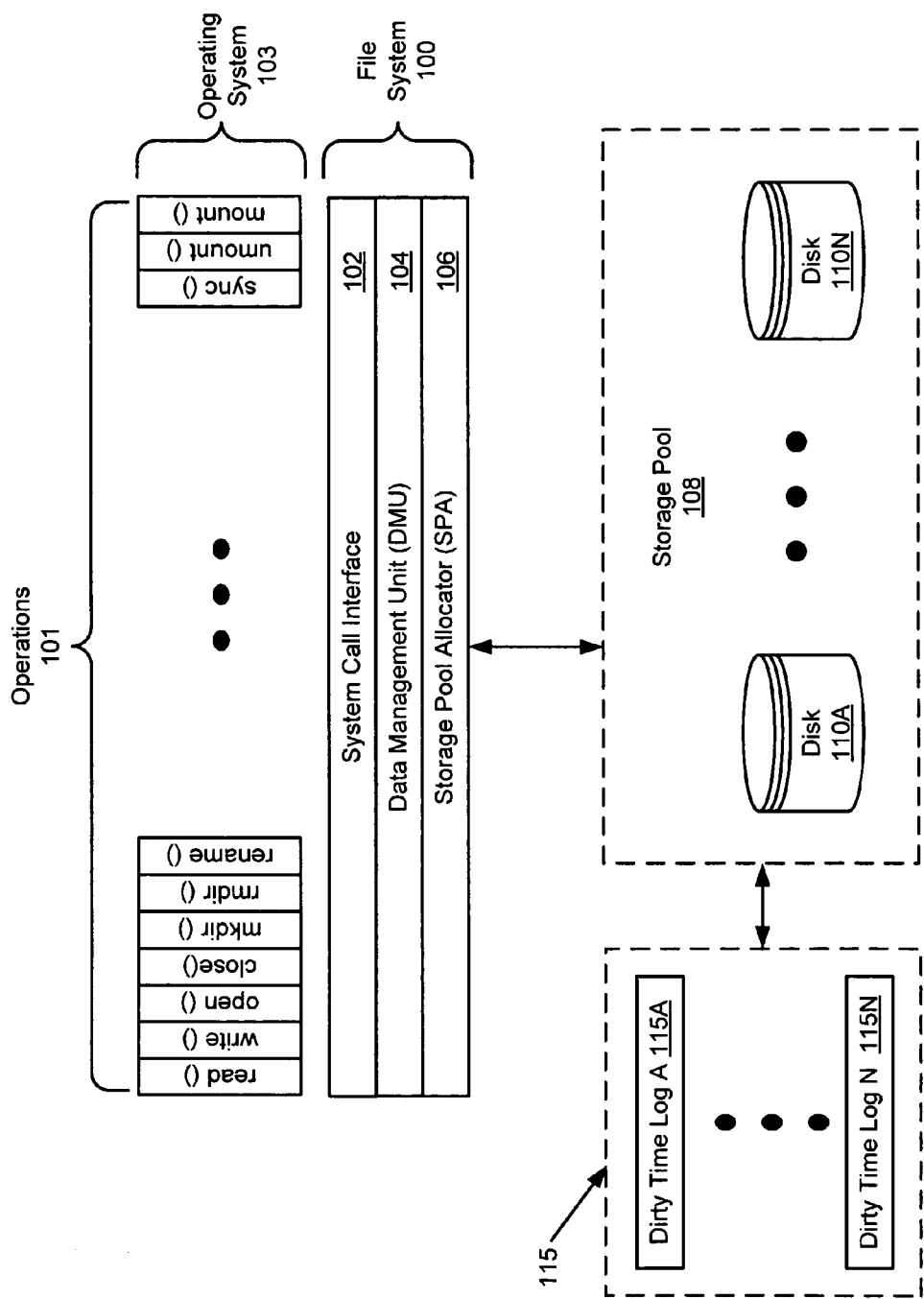
FIG. 1 shows a diagram of a system architecture in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to store a block. Specifically, embodiments of the invention attempt to store a data block or indirect block on a disk and update a dirty time log (DTL) if the attempt is not successful.

FIG. 1 shows a diagram of a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into input/output (hereinafter "I/O") requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A, 110N)). Further, in one embodiment of the invention, the storage capacity of the storage pool (108) may increase and decrease dynamically as physical disks are added and removed from the storage pool (108). In one embodiment of the invention, the storage space available in the storage pool (108) is managed by the SPA (106).

As shown in FIG. 1, each of the disks (110A, 110N) in the storage pool (108) is associated with a dirty time log (DTL) (115A, 115N). In one embodiment of the invention, the DTL (115A, 115N) tracks the times during which I/O requests were not successfully completed (i.e., the data were not stored on the disk (110A, 110N)). For example, if the disk (e.g., 110A, 110N) goes offline from 10:00 am until 10:15 am, then the DTL (e.g., 115A, 115N) for the disk (e.g., 110A, 110N) will include an entry stating that the disk (e.g., 110A, 110N) was offline from 10:00 am until 10:15 am.

As an alternative to storing the actual time that the disk (e.g., 110A, 110N) was offline, each I/O request issued to the storage pool (108) may be associated with a transaction group number. Thus, instead of storing the actual time the disk (e.g., 110A, 110N) was offline, the DTL (e.g., 115A, 115N) may store the transaction group number(s) during which the disk (e.g., 110A, 110N) was offline. More specifically, the DTL (e.g., 115A, 115N) may store the transaction group number(s) during which I/O requests were not successfully completed for the disk (e.g., 110A, 110N). Accordingly, the use of "birth time" in the following descriptions may refer to either a time or a transaction group number.

Those skilled in the art will appreciate that a single DTL may be maintained for the entire storage pool (108), where each entry identifies the particular disk (e.g., 110A, 110N) and data that could not be written to the disk because, for example, the disk (e.g., 110A, 110N) was offline. In addition, those skilled in the art will appreciate that the DTLs (e.g., 115A, 115N) may be stored in any location in the system (e.g., in the storage pool (108), in memory, etc.). In one embodiment of the invention, the SPA (106) manages the DTL (e.g., 115A, 115N) (i.e., updates the contents of the DTL (e.g., 115A, 115N), etc.).

Figure 2:
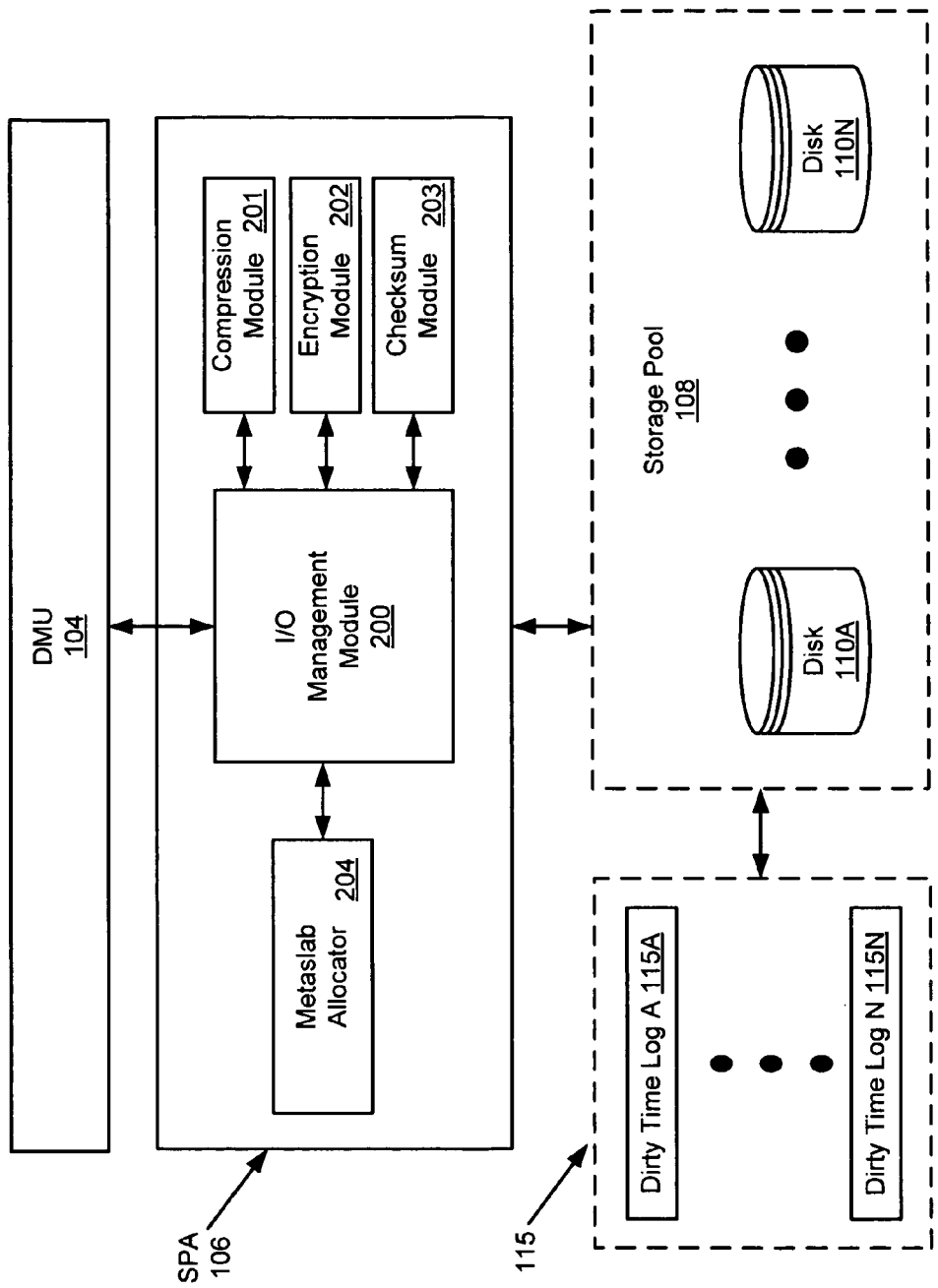
FIG. 2 shows a diagram of a storage pool allocator in accordance with one embodiment of the invention.

FIG. 2 shows a diagram of the SPA (106) in accordance with one embodiment of the invention. The SPA (106) may include an I/O management module (200), a compression module (201), an encryption module (202), a checksum module (203), and a metaslab allocator (204). Each of these aforementioned modules is described in detail below.

As noted above, the SPA (106) receives transactions from the DMU (104). More specifically, the I/O management module (200), within the SPA (106), receives transactions from the DMU (104) and groups the transactions into transaction groups, in accordance with one embodiment of the invention. The compression module (201) provides functionality to compress larger logical blocks (i.e., data blocks and indirect blocks) into smaller segments, where a segment is a region of physical disk space. For example, a logical block size of 8 KB may be compressed to a size of 2 KB for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool (108). The checksum may be used, for example, to ensure data has not been corrupted.

As discussed above, the SPA (106) provides an interface to the storage pool (108) and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool (108) by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
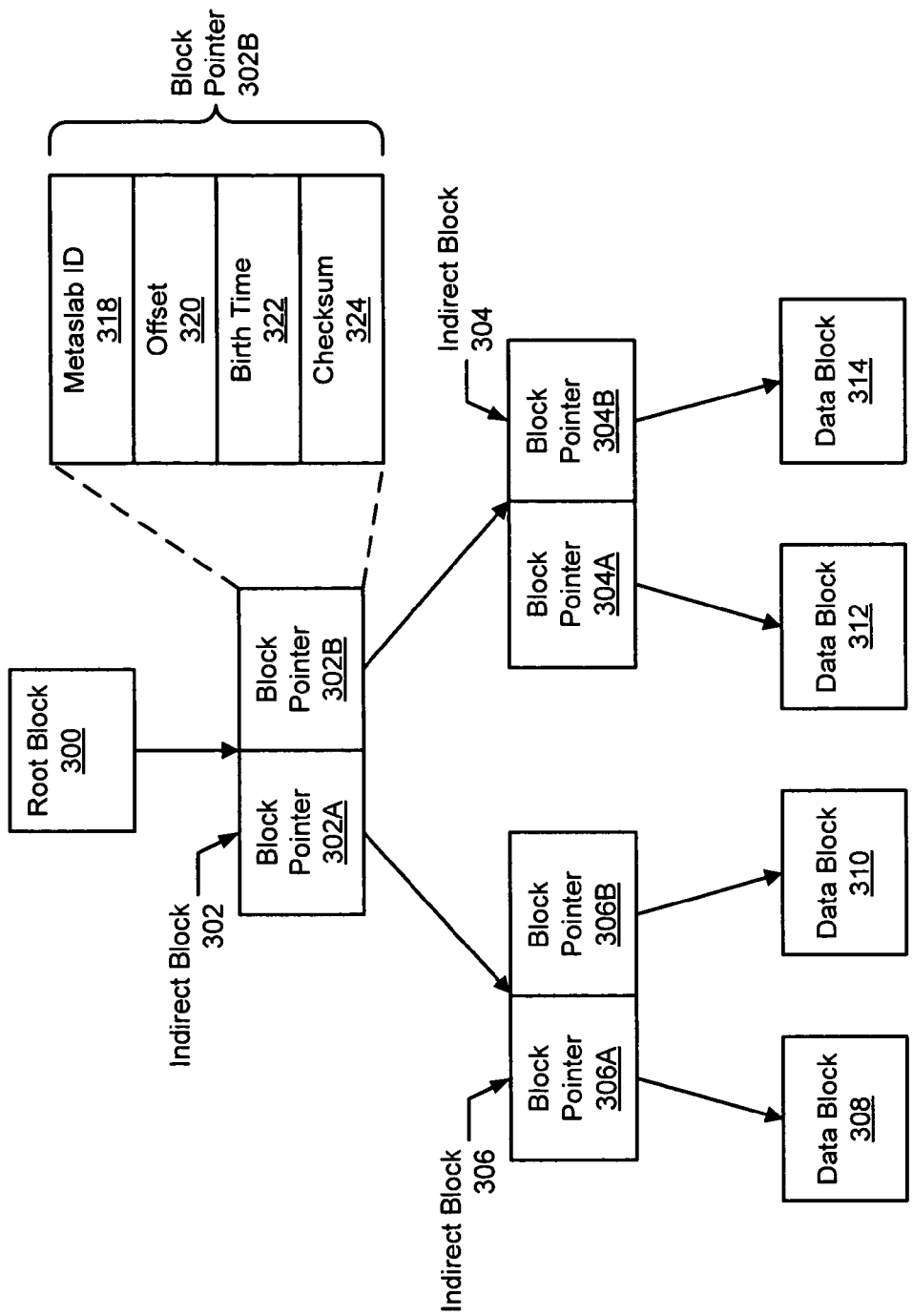
FIG. 3 shows a diagram of a hierarchical data configuration in accordance with one embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows a diagram of a hierarchical data configuration (hereinafter referred to as a "tree") for storing data blocks and indirect blocks within a storage pool (e.g., 108 in FIG. 1) in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (302A, 302B, 304A, 304B, 306A, 306B) that, directly or indirectly, reference data blocks (308, 310, 312, 314). The data blocks (308, 310, 312, 314) contain actual data of files stored in the storage pool. One skilled in the art will appreciate that several layers of indirect blocks may exist between the root block (300) and the data blocks (308, 310, 312, 314).

In contrast to the root block (300), indirect blocks (302, 304, 306) and data blocks (308, 310, 312, 314) may be located anywhere in the storage pool. In one embodiment of the invention, the root block (300) and each block pointer (302A, 302B, etc.) include data as shown in the expanded diagram of block pointer (302B). One skilled in the art will appreciate that data blocks (308, 310, 312, 314) do not include this information; rather, data blocks (308, 310, 312, 314) contain actual data of files within the file system (e.g., 100 in FIG. 1).

In one embodiment of the invention, each block pointer (e.g., 302A, 302B, etc.) includes a metaslab ID (318), an offset (320) within the metaslab, a birth time (322) of the block (i.e., data block or indirect block) referenced by the block pointer, and a checksum (324) of the data stored in the referenced block. In one embodiment of the invention, the metaslab ID (318) and offset (320) are used to determine the location of the referenced block in the storage pool. The metaslab ID (318) identifies a particular metaslab. More specifically, the metaslab ID (318) may identify the particular disk within the storage pool upon which the metaslab resides and the location on the disk where the metaslab begins. The offset (320) may then be used to reference a particular segment within the metaslab. In one embodiment of the invention, the data within the segment referenced by the particular metaslab ID (318) and offset (320) may correspond to either a data block or an indirect block. If the data corresponds to an indirect block, then the metaslab ID (318) and offset (320) within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
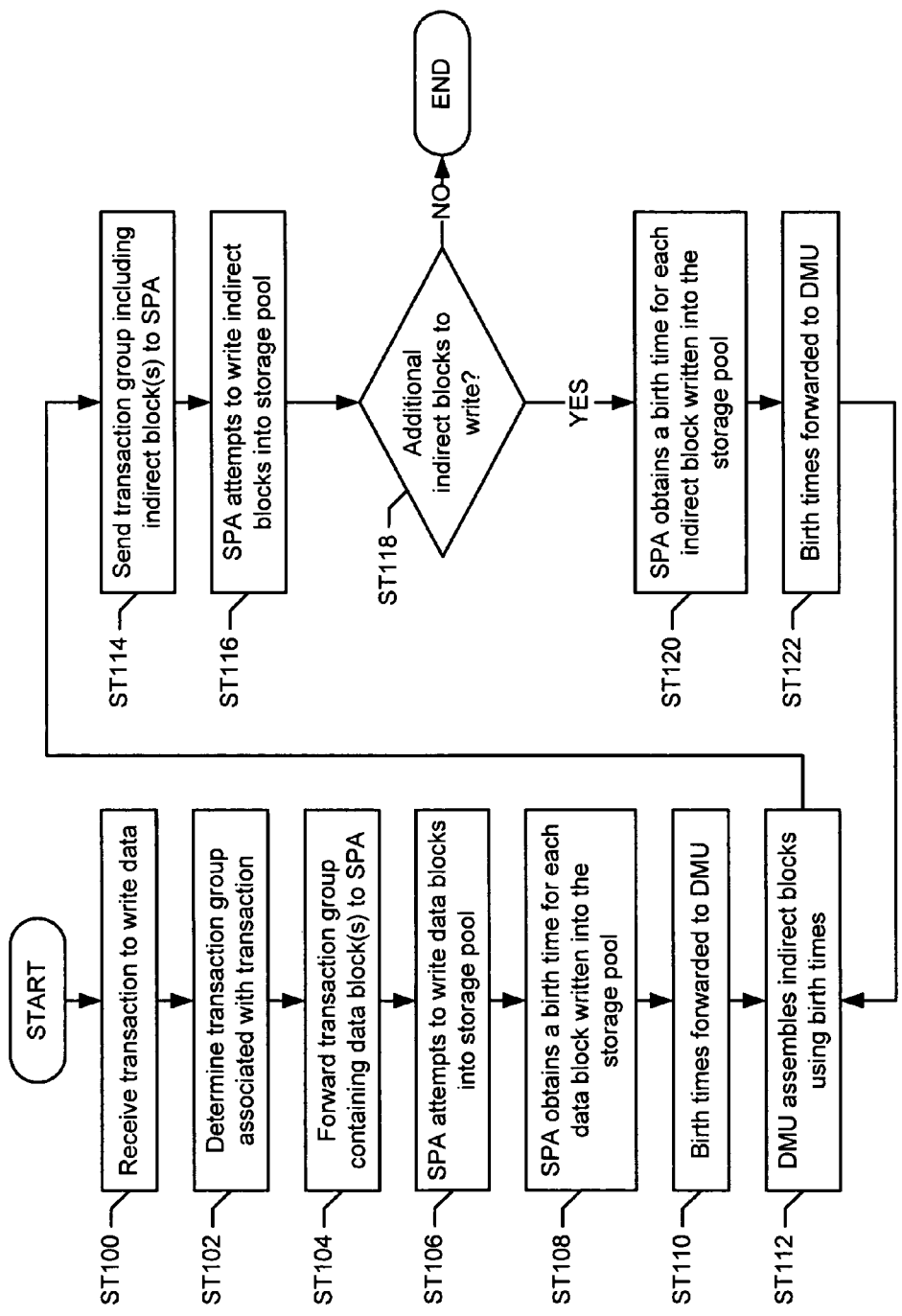
FIG. 4 shows a flow chart in accordance with one embodiment of the invention.

FIG. 4 shows a flow chart in accordance with one embodiment of the invention. More specifically, FIG. 4 shows a flow chart of a method for writing blocks (data blocks and indirect blocks) to disks in the storage pool. Initially, the DMU receives a transaction from an application, the operating system (or a subsystem therein), etc. (ST100). The DMU subsequently determines the transaction group associated with the transaction (ST102). The transaction group is subsequently forwarded to the SPA (ST104). In one embodiment of the invention, the DMU does not determine the transaction group associated with the transaction; rather, the SPA determines the transaction group after receiving the transaction.

In one embodiment of the invention, the transaction includes one or more data blocks and/or one or more indirect blocks. As noted above, the file system is stored on disk using a hierarchical structure including data blocks and indirect blocks. Thus, for a given transaction, the initial transaction group includes I/O requests for the data blocks to be written to disk, while subsequent transaction groups include I/O requests corresponding to the indirect blocks containing one or more block pointers. Accordingly, the transaction group referenced in ST104 includes I/O requests to write data blocks.

Continuing with the discussion of FIG. 4, upon receiving the transaction group including I/O requests to write data blocks from the DMU, the SPA attempts to write the data blocks into the storage pool (ST106). Those skilled in the art will appreciate that if a data block is not written successfully, then the birth time of the block may be stored in a dirty time log (DTL), indicating that the write attempt was not successful. Further, those skilled in the art will appreciate that the birth time(s) stored in the DTL may be equivalent to the birth time(s) that would have been associated with a successful write to disk. Further, those skilled in the art will appreciate that if the write attempt fails, an attempt may be made to store the data block at another location. If the data block is stored in another location, then the DTL may not be updated.

Continuing with the discussion of FIG. 4, if the write attempt is successful, then the SPA subsequently obtains a birth time for each data block written into the storage pool (ST108). Those skilled in the art will appreciate that the birth time(s) used in ST108 are associated with successful write attempts. The birth times are subsequently forwarded to the DMU (ST110). The DMU then assembles the indirect blocks using the birth times (ST112). Specifically, the DMU places the birth time for a given data block in the appropriate block pointer within the indirect block (i.e., the parent indirect block of the data block). Next, the indirect blocks are forwarded to the SPA (ST114). Those skilled in the art will appreciate that the aforementioned indirect blocks (i.e., those blocks assembled in the first iteration of ST112) correspond to the indirect blocks that point directly to the data blocks, via the block pointers (as opposed to indirect blocks that point to other indirect blocks).

Next, the SPA receives and subsequently attempts to write the indirect blocks into the storage pool (ST116). Those skilled in the art will appreciate that if an indirect block is not written successfully, then the birth time of the block may be stored in a dirty time log (DTL), indicating that the write attempt was not successful. Further, those skilled in the art will appreciate that the birth time(s) stored in the DTL may be equivalent to the birth time(s) that would have been associated with a successful write to disk. Further, those skilled in the art will appreciate that if the write attempt fails, an attempt may be made to store the indirect block at another location. If the indirect block is stored in another location, then the DTL may not be updated.

Continuing with the discussion of FIG. 4, if the write attempt is successful, then a determination is then made whether additional indirect blocks exist to write into the storage pool (i.e., whether the last indirect block written to the storage pool corresponds to the root block) (ST118). If no additional indirect blocks exist, then the method is complete. However, if additional indirect blocks exist, then the SPA obtains a birth time for each of the indirect blocks written into the storage pool (ST120). Those skilled in the art will appreciate that the birth time(s) used in ST120 are associated with successful write attempts. The birth time for each of the indirect blocks is subsequently forwarded to the DMU (ST122). Steps ST112 through ST122 are subsequently repeated until the root block is written into the storage pool.

Those skilled in the art will appreciate that updating a DTL if a write attempt fails, as described above, offers fast performance and/or low system overhead, because the DTL is only updated if a write fails. Further, the use of birth times in the DTL minimizes the amount of storage space required to maintain the DTL. In addition, if many writes fail with the same birth time, the DTL only has to be updated once.

Figure 5:
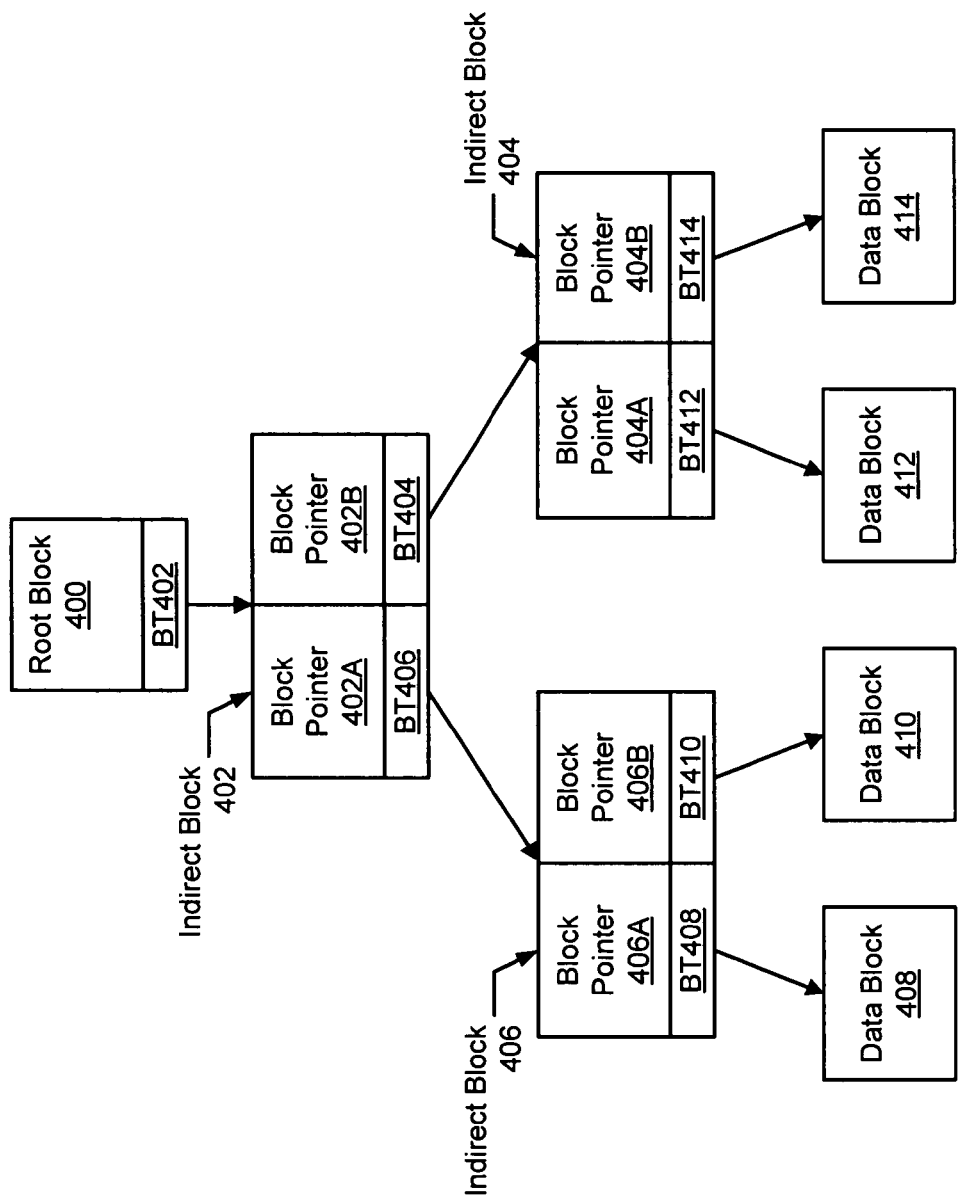
FIG. 5 shows a diagram of a hierarchical data configuration in accordance with one embodiment of the invention.

FIG. 5 shows a diagram of a hierarchical data configuration (hereinafter referred to as a "tree") in accordance with one embodiment of the invention. Specifically, FIG. 5 shows a detailed diagram of the data blocks and indirect blocks resulting from the method described in FIG. 4, in accordance with one embodiment of the invention. Specifically, the file system includes four data blocks (408, 410, 412, 414). Those skilled in the art will appreciate that four data blocks are used for exemplary purposes only; any number of data blocks may be used. Each data block (408, 410, 412, 414) within the file system has a corresponding birth time (BT408, BT410, BT412, BT414, respectively) stored in the corresponding block pointer (406A, 406B, 404A, 404B, respectively). Each of the block pointers (406A, 406B, 404A, 404B) is stored in an indirect block (406, 404). Each indirect block (406, 404) also has a corresponding birth time (BT406, BT404, respectively) stored in a corresponding block pointer (402A, 402B, respectively) in a parent indirect block (402). In this particular example, the indirect block (402) is referenced by a root block (400). The root block (400) includes the birth time (BT402) for the indirect block (402). Those skilled in the art will appreciate that the root block (400) may include birth times for additional indirect blocks (not shown), or for an array of indirect blocks.

Figure 6:
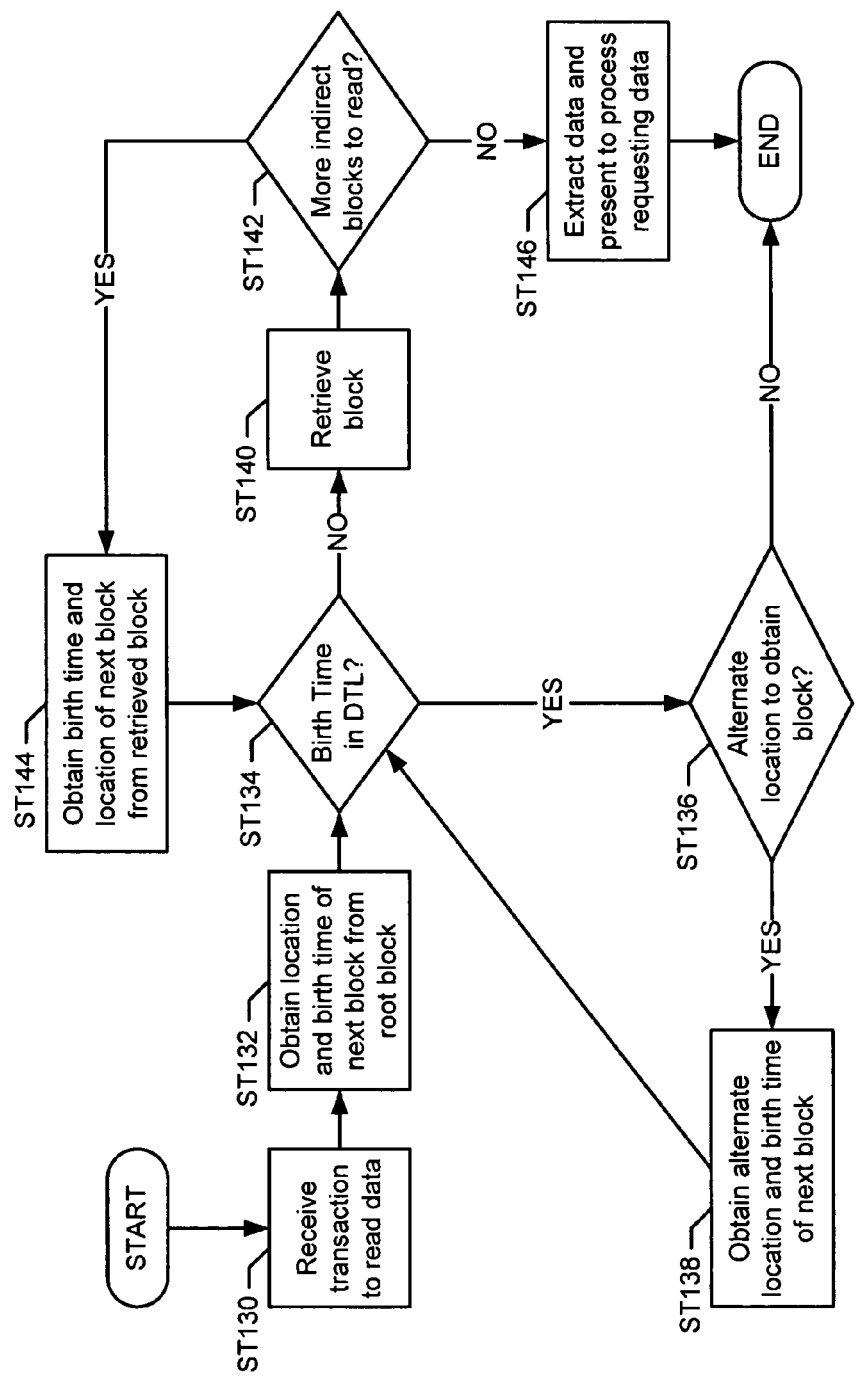
FIG. 6 shows a flow chart in accordance with one embodiment of the invention.

FIG. 6 shows a flow chart in accordance with one embodiment of the invention. More specifically, FIG. 6 shows a flow chart of a method for reading data in accordance with one embodiment of the invention. Initially, a transaction to read data is received (ST130). A birth time and a location of the next block (i.e., a data block or indirect block) is subsequently retrieved from the root block (ST132). A determination is then made as to whether the birth time is in a dirty time log (DTL) (ST134). Those skilled in the art will appreciate that the DTL referenced in ST134 corresponds to the DTL associated with the disk upon which the block is stored.

If the birth time is not in the DTL, then the location (e.g., the metaslab ID and offset) is subsequently used to obtain the block (i.e., the data block or the indirect block) (ST140). Then a determination is made about whether there are more indirect blocks to read (ST142). That is, if the retrieved block is a data block, then there are no more indirect blocks to read, so the data are extracted from the data block and presented to the process requesting the data (ST146). Alternatively, if the retrieved block is not a data block, then the birth time and location of the next block (stored within a block pointer within the retrieved block) is obtained (ST144). Steps ST134 through ST144 are subsequently repeated until either data cannot be retrieved (i.e., ST136, as discussed below) or the data block is encountered (i.e., ST146).

If the birth time is in the DTL, then a determination is made about whether an alternate location of the block is available (ST136). In one embodiment of the invention, the alternate location of the block may correspond to a location of a copy of the block stored on another disk (e.g., a mirror). If an alternate location of the block is not available, then the process ends and the data cannot be retrieved. If an alternate location is available, then the alternate location of the block as well as the birth time of the block at the alternate location are obtained (ST138). The process then proceeds to ST134.

Those skilled in the art will appreciate that the method of FIG. 6 may guarantee that data retrieved from disk are valid, without requiring a disk to be resynchronized prior to reading the data. That is, by mirroring data across a plurality of disks, and maintaining a DTL for each disk, a file system may be able to retrieve a valid copy of the data, even though one or more disks may have failed.

Figure 7:
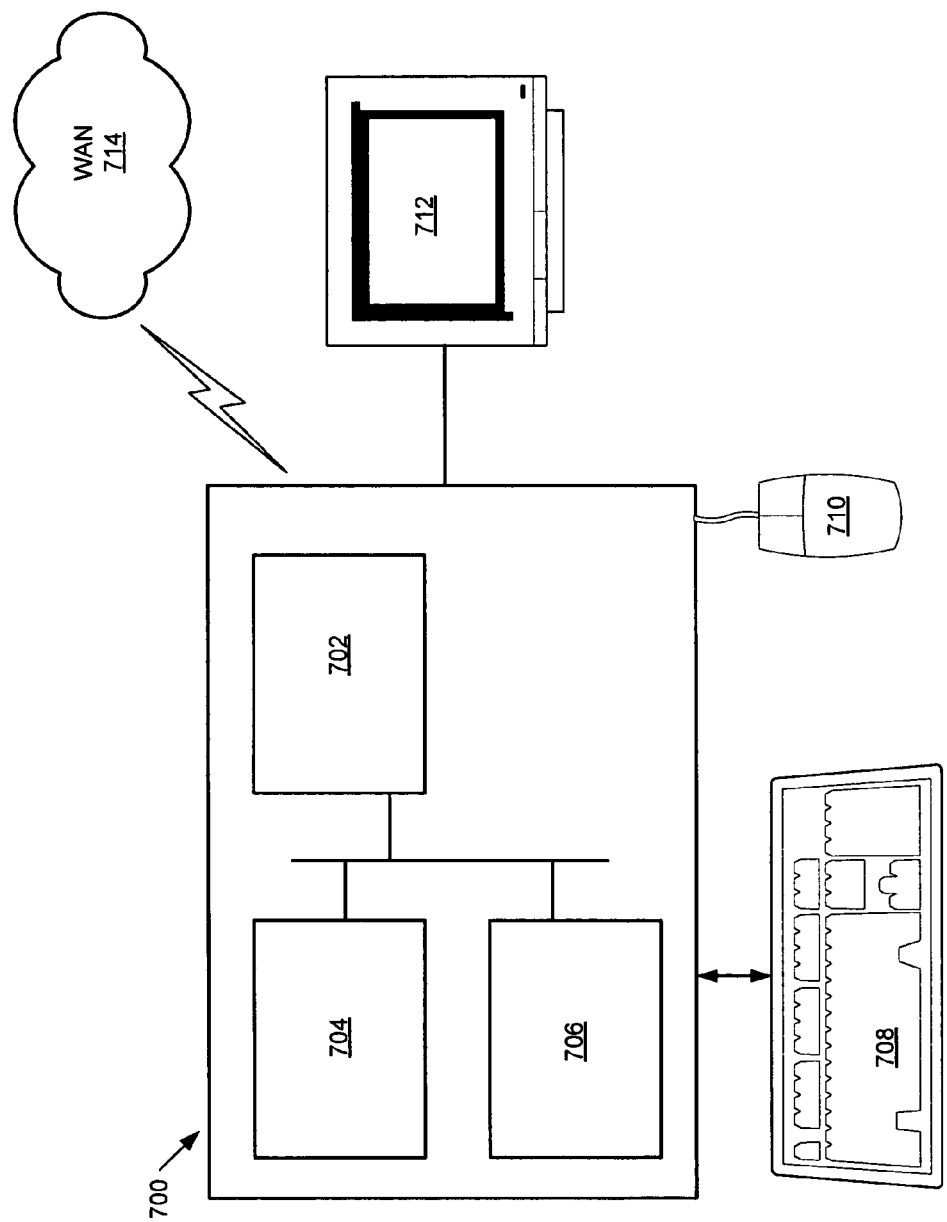
FIG. 7 shows a diagram of a computer system in accordance with one embodiment of the invention.

The invention may be implemented on virtually any type of computer regardless of the platform being used. For example, as shown in FIG. 7, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) may be connected to a local area network (LAN) or a wide area network (e.g., the Internet) (714) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, the invention may be implemented on a distributed system having a plurality of nodes, where each portion of the invention (e.g., operating system, file system, system call interface, DMU, SPA, storage pool, disk, dirty time log, metaslab allocator, I/O management module, compression module, encryption module, checksum module, root block, data block, indirect block, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for storing a block in a file system, comprising:
    making a first attempt to store a first block at a first location on a disk, wherein the first block is associated with a first birth time and is a first data block, wherein the first birth time is a time;
    making a second attempt to store the first data block associated with the first birth time at a second location on the disk, wherein the first and second attempts to store the first data block fail, and wherein the first location and the second location are physically distinct locations on the disk;
    updating a dirty time log (DTL), only after both the first attempt and the second attempt to store the first data block fail, with the first birth time.

2. The method of claim 1, wherein a first indirect block stored on disk comprises the first birth time of the first data block and a location of the first data block.

3. The method of claim 1, wherein the DTL is associated with the disk.

4. The method of claim 1, wherein the DTL is associated with a storage pool comprising the disk, and wherein updating the DTL comprises storing the first birth time and an identifier of the disk.

5. The method of claim 2, wherein the first data block and the first indirect block are associated with a file in the file system.

6. The method of claim 1, further comprising:
    making a first attempt to store a second block at a third location on the disk, wherein the second block is a data block, and wherein the second block is stored successfully and is associated with a second birth time;
    making a first attempt to store a third block at a fourth location on the disk, wherein the third block is an indirect block comprising:
        a first block pointer referencing the second block, wherein the first block pointer comprises the second birth time of the second block, and
        a second block pointer comprising the first birth time of the first block,
    wherein the first attempt to store the third block places the indirect block hierarchically above the second block and associates the indirect block with a third birth time; and
    updating the DTL with the third birth time when the third indirect block is not stored successfully on the disk,
    wherein the second birth time and the third birth time are each a time, and wherein each of the first, second, third, and fourth locations on disk is distinct.

7. A system comprising:
    a disk configured to:
        store a plurality of data blocks and indirect blocks;
    a storage pool allocator configured to store a first block on the disk; and
    a dirty time log (DTL) associated with a file system and configured to store a first birth time associated with a first data block, only when a first attempt to store the first data block at a first location on the disk and a second attempt to store the first data block at a second, distinct location on the disk both fail, wherein the first birth time is a time.

8. The system of claim 7, wherein a first indirect block stored on the disk comprises the birth time of the data block and a location of the first data block.

9. The system of claim 7, wherein the DTL is associated with the disk.

10. The system of claim 7, wherein the DTL is associated with a storage pool comprising the disk, and is further configured to store an identifier of the disk when the first data block is not stored successfully.

11. The system of claim 8, wherein the first data block and the first indirect block are associated with a file in the file system.

12. A non-transitory computer readable medium comprising executable instructions for storing a block in a file system by:
    making a first attempt to store a first block at a first location on a disk, wherein the first block is associated with a first birth time and is a first data block, wherein the first birth time is a time;
    making a second attempt to store the first data block associated with the first birth time at a second location on the disk, wherein the first attempt and the second attempt to store the first data block fail, and wherein the first location and the second location are physically distinct locations on the disk;
    updating a dirty time log (DTL), only after both the first attempt and the second attempt to store the first data block fail, with the first birth time.

13. The non-transitory computer readable medium of claim 12, wherein a first indirect block comprises the first birth time of the first data block and a location of the first data block.

14. The non-transitory computer readable medium of claim 12, wherein the DTL is associated with the disk.

15. The non-transitory computer readable medium of claim 12, wherein the DTL is associated with a storage pool comprising the disk, and wherein updating the DTL comprises storing the first birth time and an identifier of the disk.

* * * * *